(12) United States Patent
Oak et al.

(10) Patent No.: US 11,196,809 B2
(45) Date of Patent: Dec. 7, 2021

(54) MOBILE CLOUD SYSTEM AND OPERATING METHOD OF THE SAME

(71) Applicant: NHN Entertainment Corporation, Seongnam-si (KR)

(72) Inventors: Kyoung Hwan Oak, Seongnam-si (KR); Cheol Hyeon Jo, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 198 days.

(21) Appl. No.: 15/976,784

(22) Filed: May 10, 2018

(65) Prior Publication Data
US 2018/0332114 A1    Nov. 15, 2018

(30) Foreign Application Priority Data
May 12, 2017    (KR) .................. 10-2017-0059366

(51) Int. Cl.
*H04L 29/08*    (2006.01)
*H04W 12/06*    (2021.01)
(Continued)

(52) U.S. Cl.
CPC .......... *H04L 67/1097* (2013.01); *H04L 67/04* (2013.01); *H04L 67/10* (2013.01);
(Continued)

(58) Field of Classification Search
CPC ..... H04L 67/1097; H04L 67/32; H04L 67/04; H04L 67/10; H04L 63/0876; H04L 67/16; H04W 12/06; H04W 12/00512
(Continued)

(56) References Cited

U.S. PATENT DOCUMENTS 8,539,567 B1 *  9/2013  Logue ................... H04L 63/08
                                                                726/7
9,454,363 B1 *  9/2016  Angell .................... G06F 8/65
                        (Continued)

FOREIGN PATENT DOCUMENTS

JP    2006-351024    12/2006
JP    2009-176097     8/2009
                (Continued)

OTHER PUBLICATIONS

Office Action dated Apr. 16, 2019, issued in Japanese Patent Application No. 2018-092062.
(Continued)

*Primary Examiner* — Brian Whipple
*Assistant Examiner* — John Fan
(74) *Attorney, Agent, or Firm* — H.C. Park & Associates, PLC

(57) ABSTRACT

A mobile cloud system includes a plurality of mobile terminals having at least one functional module and a communicator; a cloud server to receive the information acquired from the at least one functional modules, the cloud server including a read-only file system to provide services applied to all of the plurality of connected mobile terminals, a read/write file system to provide independent services applies to each of the plurality of connected mobile terminals, and a controller to control operations of the both file systems; and a wireless communication network to provide a network between the plurality of mobile terminals and the cloud server.

11 Claims, 5 Drawing Sheets

(51) Int. Cl.
    *H04L 29/06*     (2006.01)
    *H04W 12/71*     (2021.01)

(52) U.S. Cl.
    CPC .............. *H04L 67/16* (2013.01); *H04L 67/32* (2013.01); *H04W 12/06* (2013.01); *H04L 63/0876* (2013.01); *H04W 12/71* (2021.01)

(58) Field of Classification Search
    USPC ........................................................ 709/219
    See application file for complete search history.

(56) References Cited

U.S. PATENT DOCUMENTS

| | | | | |
|---|---|---|---|---|
| 9,582,559 | B1* | 2/2017 | Faibish | G06F 11/2089 |
| 2007/0266027 | A1* | 11/2007 | Gattegno | H04L 67/1097 |
| 2009/0271472 | A1* | 10/2009 | Scheitler | H04L 41/5051 |
| | | | | 709/202 |
| 2014/0047070 | A1* | 2/2014 | Lee | H04L 67/02 |
| | | | | 709/219 |
| 2014/0164750 | A1* | 6/2014 | Tang | G06F 9/45558 |
| | | | | 713/1 |
| 2014/0258717 | A1* | 9/2014 | Baek | G06F 21/6218 |
| | | | | 713/165 |
| 2015/0049673 | A1* | 2/2015 | Higashiyama | H04L 41/22 |
| | | | | 370/328 |
| 2015/0242601 | A1 | 8/2015 | Griffiths et al. | |
| 2015/0312759 | A1* | 10/2015 | Kim | G06F 21/10 |
| | | | | 455/411 |
| 2016/0019433 | A1 | 1/2016 | Saito | |
| 2016/0094473 | A1 | 3/2016 | Mordani et al. | |
| 2016/0307434 | A1 | 10/2016 | Wang et al. | |

FOREIGN PATENT DOCUMENTS

| | | | |
|---|---|---|---|
| JP | 2012-58904 | | 3/2012 |
| JP | 2014215802 | | 11/2014 |
| JP | 2016-24471 | | 2/2016 |
| JP | 2017-511526 | | 4/2017 |
| KR | 20130063399 A | * | 6/2013 |
| KR | 20140129715 A | * | 11/2014 |

OTHER PUBLICATIONS

Notice of Allowance dated Nov. 12, 2019, issued in Japanese Patent Application No. 2018-092062.

* cited by examiner

MOBILE CLOUD SYSTEM AND OPERATING METHOD OF THE SAME

CROSS REFERENCE TO RELATED APPLICATION

This application claims priority from to and the benefit of Korean Patent Application No. 10-2017-0059366, filed on May 12, 2017, which is hereby incorporated by reference for all purposes as if fully set forth herein.

BACKGROUND

Field

Exemplary implementations of the invention relate generally to a cloud system, and more specifically, to a mobile cloud system and operating method of the same.

Discussion of the Background

Cloud computing refers to a computing environment that can use services such as data storage, network, and content usage through servers on the Internet. In other words, the cloud computing may be a computing environment in which information is permanently stored on a server on the Internet and is temporarily stored on clients such as desktops, tablet computers, notebooks, etc., so that all of the user's information is stored on a server on the Internet, and the information can be used anytime and anywhere through various client devices.

Conventional cloud computing services using cloud computing have been provided for fixed terminals such as desktops.

However, in recent years, as the technology for wireless networks has advanced and the performance of mobile devices has improved, the demand for mobile cloud computing technology that combines cloud computing and mobile has increased.

The above information disclosed in this Background section is only for understanding of the background of the inventive concepts, and, therefore, it may contain information that does not constitute prior art.

SUMMARY

Applicant realized that conventional mobile phones and cloud computing environments are unsuitable for efficient, mobile cloud computing.

Mobile cloud systems constructed according to the principles and exemplary implementations of the invention, and operating methods thereof, are capable of implementing high security and high performance mobile cloud systems, e.g., by separating cloud servers into read-only file systems that all mobile devices share and read/write file systems that can be accessed on a user-specific basis.

Separate file system structures constructed according to the principles and exemplary embodiments of the invention permit the mobile devices to contain less hardware and/or software, thereby enabling the mobile devices to be lighter in weight, smaller and/or less expensive. Moreover, the cloud server in such systems may efficiently perform the required computing functions, including performing calculations, and processing and storing data based upon information acquired from functional modules of the mobile device via a mobile communication network.

Mobile cloud systems constructed according to the principles and exemplary embodiments of the invention can provide the same usability, convenience and functionality as a high-end mobile terminal, such as an expensive smart phone, even if low-end, inexpensive mobile terminals are employed.

Additional features of the inventive concepts will be set forth in the description which follows, and in part will be apparent from the description, or may be learned by practice of the inventive concepts.

According to one aspect of the invention, a mobile cloud system includes a plurality of mobile terminals having at least one functional module and a communicator; a cloud server to receive the information acquired from the at least one functional modules, the cloud server including a read-only file system to provide services applied to all of the plurality of connected mobile terminals, a read/write file system to provide independent services applies to each of the plurality of connected mobile terminals, and a controller to control operations of the both file systems; and a wireless communication network to provide one or more communication channel between the plurality of mobile terminals and the cloud server.

The at least one functional module may include one or more of a display module, an audio module, an input module, a camera module, and a GPS module.

The communicator may include a mobile cloud platform.

The mobile cloud platform may include: a network connection unit to communicate with the wireless communication network and the cloud server, and to maintain and manage a channel formed between the mobile terminal and the cloud server for providing a cloud service; a cloud service interworking unit to communicate with the cloud server through the network connection unit and provide the cloud computing service to the mobile terminal; and a security and authentication information management unit to manage authentication information of the mobile terminal.

The authentication information may include at least one of hardware information such as a MAC address, a CPU ID, and an IMEI allocated to each mobile terminal.

The cloud service may include a cloud computing service.

The read-only file system may include a shared database, a shared memory, firmware, an operating system, and applications commonly used by the plurality of mobile terminals.

The read/write file system may include a user-specific database, a user-specific memory, and applications independently used by individual ones of the plurality of mobile terminals according to individual user preferences.

The controller may be configured to determine whether a request from the mobile terminal is to be processed in the read only file system or in the read/write file system, and to communicate the request to the corresponding file system.

The controller may include a processor capable of processing signals of the functional modules transmitted from the plurality of mobile terminals.

According to another aspect of the invention, a method of operating a mobile cloud system includes the steps of: booting a mobile terminal; authenticating whether the mobile terminal can receive a cloud service; operating a communicator installed in the mobile terminal and activating the cloud service; transmitting signals acquired from at least one function modules in the mobile terminal to a cloud server through the communicator; an processing the signals from the at least one function module in the cloud server.

The operating method may further include the step of storing the information in a shared memory of a read only file system in the cloud server if the signals from the functional modules may include information corresponding to a common service area.

The operating method may further include the step of storing the information in a specific-user memory of the read/write file system in the cloud server if the signals from the functional modules may include information corresponding to a user-specific service area.

The step of authentication may include allocating hardware by using information from at least one of a MAC address, a CPU ID, and an IMEI allocated to each user who uses the mobile terminal whenever the cloud service is requested.

The step of operating a communicator installed in the mobile terminal and activating the cloud service may include operating a mobile cloud platform.

The step of operating a communicator installed in the mobile terminal and activating the cloud service may include activating a cloud computing service.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
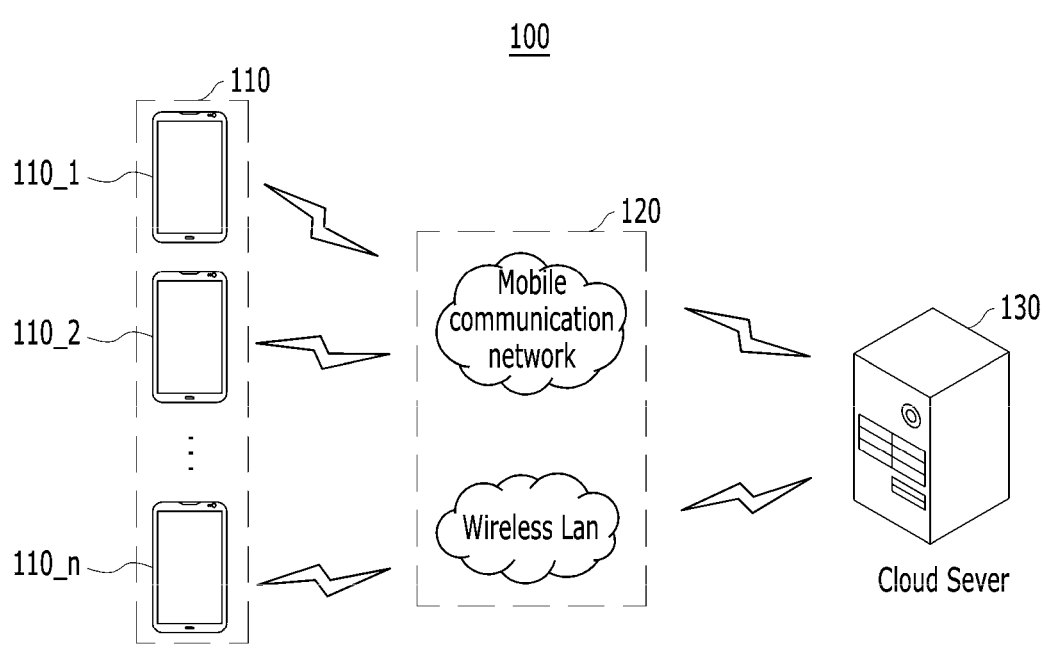
FIG. 1 is a schematic block diagram of an exemplary embodiment of mobile cloud system constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, a server, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, a server, and/or one or more components thereof may include or otherwise be associated with one or more memories (not shown) including code (e.g., instructions) configured to cause a server, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic block diagram of an exemplary bodiment of mobile cloud system constructed according to the principles of the invention.

Referring to FIG. 1, a mobile cloud system 100 according to an exemplary embodiment may include a mobile terminal 110, a wirelesswireles unication network 120, and a cloud server 130.

The mobile terminal 110 may be portable terminals 110_1, 110_2, and 110_n capable of performing data communication through the wireless communication network 120. The mobile may be implemented as or in any portable mobile device, such as a phone, watch, laptop, or any other portable electronic device. Each of the mobile terminals may include a communication module, which may be in the form of a mobile cloud platform, and may access the cloud server 130 through the mobile cloud platform to use application, storage, OS, firmware, and the like of the cloud server 130.

In general, conventional mobile devices such as smart phones, tablet phones, and the like may include all of a central processing unit (CPU), a storage device, and various functional modules (e.g., camera, GPS, microphone, etc. within a single physical device.

On the other hand, mobile terminals 110 constructed according to the exemplary embodiments eliminate these large-capacity and high-cost elements such as a central processing unit (CPU) and a storage device, unlike conventional mobile devices. That is, the mobile terminal 110 may only include basic processors and storage capable of operating the mobile cloud platform.

In this configuration, the mobile terminal may include a number of functional electronic modules to carry out basic operations. The information generated by the function modules of the mobile terminal 110 is not processed in the terminal itself, but may be transmitted to the cloud server 130 and computed and stored, thereby enabling high security and high performance associated with dedicated servers. In other words, the information acquired from the function modules included in the mobile terminal is transmitted to the cloud server (e.g., redirection), and the components (e.g., CPU, GPU, RAM) that perform the operations are implemented in high performance hardware in the cloud server 130, which enables high security and high performance even with low-end mobile terminals.

The specific configuration and operation of an exemplary mobile terminal 110 will be described in more detail with reference to FIGS. 2, 3 and FIG. 5.

The wireless communication network 120 may provide various network environments depending on the type of the mobile terminal 110, such as a mobile communication network or a wireless LAN network, or even the Internet.

The cloud server 130 may be connected to the plurality of mobile terminals 110_1, 110_2, . . . , 110_n and provides a cloud computing service. For example, when the connection of the mobile terminal 110 is detected and authenticated, the cloud server 130 may provide the cloud computing services to the authenticated mobile terminal 110 according to the request from the authenticated mobile terminal 110. The cloud server 130 may include at least one server device.

The cloud server 130 constructed according to an exemplary embodiment may include a read only file system, which is a common service area enabled to be shared and used by multiple mobile terminals, and a read/write file system, which is a user-specific, personal service area. The cloud server 130 may calculate and store information acquired from the functional modules of the mobile device.

The specific configuration and operation of the exemplary cloud server 130 will be described in more detail with reference to FIG. 4 and FIG. 5.

Figure 2:
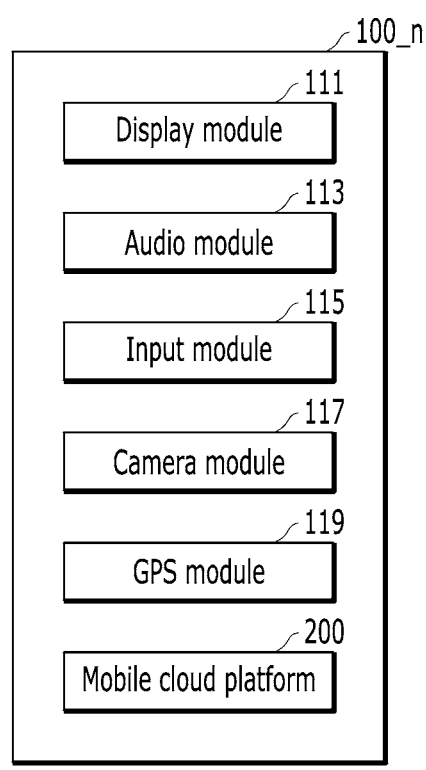
FIG. 2 is a block diagram of an exemplary embodiment of a mobile terminal shown in FIG. 1.

FIG. 2 is a block diagram of an exemplary embodiment of a mobile terminal shown in FIG. 1.

Referring to FIG. 2, the mobile terminal 110_n according to an exemplary embodiment may include a plurality of functional modules 111, 113, 115, 117, and 119 and a mobile cloud platform 200.

In FIG. 2, the functional modules include a display module 111, audio module 113, input module 115, camera module 117, and GPS module 119. However, exemplary embodiments are not limited thereto. Accordingly, the mobile terminal 110_n may include only one or more of the functional modules 111, 113, 115, 117, and 119 or further include other functional modules that perform other functions.

The display module 111 may include any suitable screen or projection system for providing a display visual to the user. For example, the display module 111 may include a screen (e.g., an LCD screen) that is incorporated in the mobile terminal 110_n.

The audio module 113 may include any suitable audio component for providing audio to the user. For example, the audio module 113 may include a speaker and/or a microphone.

The input module 115 may be a user interface for giving input or command of a user. For example, the input module 115 may take a variety of forms, such as a button, a keypad, a dial, a click wheel, or a touch screen.

The camera module 117 may be implemented as a camera device including one or more functions of capturing a still image and a video image, editing functionality, communication interoperability for transmission and sharing, a photo/video, and the like.

The GPS module 119 is a module that receives a signal transmitted from a GPS satellite and calculates a current position of the user as is known in the art. The mobile terminal 110_n according to the exemplary embodiment can be provided with a more accurate location-based service (LBS) by including the UPS module 119.

Such functional modules 111, 113, 115, 117, and 119 are directly utilized through a mobile terminal, which may be carried by the user, and predetermined information is acquired through each functional module at the same time as utilizing the functional modules.

For example, when the user takes a picture a video image using the camera module 117, the camera module generates signals corresponding to the photographed video image. Also, when the user moves the mobile terminal, the GPS module 119 generates signals corresponding to the current position of the user.

As mentioned briefly above, conventional mobile devices typically include a high-performance central processing unit (CPU) and a storage device therein in order to process signals generated from functional modules. However, such devices have drawbacks, including highs cost and security issues, especially when a mobile device is lost.

On the other hand, the mobile terminal 110_n according to the exemplary embodiments may eliminate large-capacity and high-cost elements such as a central processing unit (CPU) and a storage device unlike the conventional mobile device. The mobile terminal 110_n may only include the functional modules 111, 113, 115, 117, and 119 and the mobile cloud platform 200.

According to the precise configuration to the mobile terminal 110_n, the information generated using the functional modules 111, 113, 115, 117, and 119, that is, the signals corresponding to the operations of the functional modules, are not processed in the mobile terminal itself. The signals may be transmitted to the cloud server 130 and processed and stored in the cloud server 130. That is, the information acquired from the functional modules in the mobile terminal may be transmitted to the cloud server 130 (e.g., redirection), and the cloud server 130 may include components (e.g., CPU, GPU, RAM) which are implemented with high-performance hardware, so that high security and high performance can be achieved even with low-end mobile terminals.

The signals acquired by the function modules 111, 113, 115, 117, and 119, that is, signals generated by the user using the function modules may be transmitted to the cloud server 130 via the mobile cloud platform 200 included in the mobile terminal. In addition, the mobile cloud platform 200 may be provided with a cloud application from the cloud server 130 and perform a cloud computing service. The cloud application may refer to various cloud applications that can be driven by the mobile cloud platform 200.

Although not shown in FIG. 2, the mobile terminal 110_n may include a basic processor and storage that allow the mobile cloud platform 200 to operate.

Figure 3:
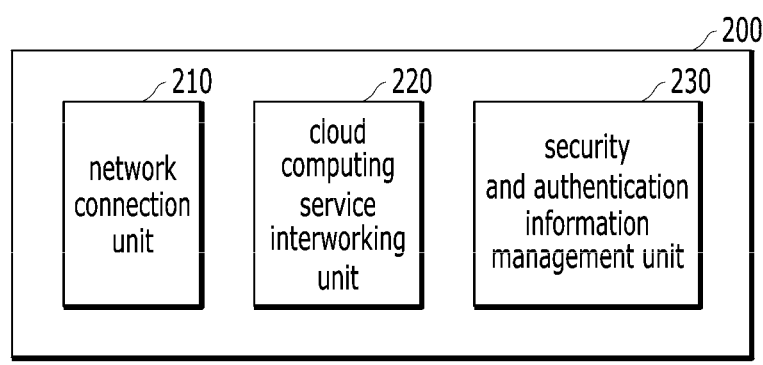
FIG. 3 is a block diagram of an exemplary embodiment of a mobile cloud platform shown in FIG. 2.

FIG. 3 is a block diagram of an exemplary embodiment of a mobile cloud platform shown in FIG. 2.

Referring to FIG. 3, a communicator 200, may be implemented as a mobile cloud platform, which according to an exemplary embodiment of the invention may include a network connection unit 210, a cloud computing service interworking unit 220, and a security and authentication information management unit 230.

The network connection unit 210 may connect to a wireless communication network implemented by a mobile communication network, a wireless LAN, and the like, and connect to the cloud server 130. Also the network connection unit 210 may maintain and manage a channel formed between the mobile terminal 110 and the cloud server 130 for providing the cloud computing service.

When the mobile cloud platform 200 is operated, the cloud computing service interworking unit 220 may connect to the cloud server 130 through the network connection unit 210 and provide the cloud computing service.

The cloud computing service may transmit information generated using the functional modules 111, 113, 115, 117, and 119 of the mobile terminal, that is, signals corresponding to the operations of the functionalodules, to the cloud server 130, and the cloud serve 130 may process, calculate and/or store the signals. In addition, the cloud computing service may receive the cloud applications or the like from the cloud server 130 and operate the cloud applications or the like.

The security and authentication information management unit 230 may manage the authentication information of the mobile terminal 110. The authentication information may be information which utilizing hardware information such as a MAC address, a CPU ID, and an IMEI allocated to each user using each mobile terminal. For example, whenever the cloud computing service is requested, it can be authenticated using a method of allocating hardware by utilizing hardware information, so that physical hardware resources can be efficiently used.

Figure 4:
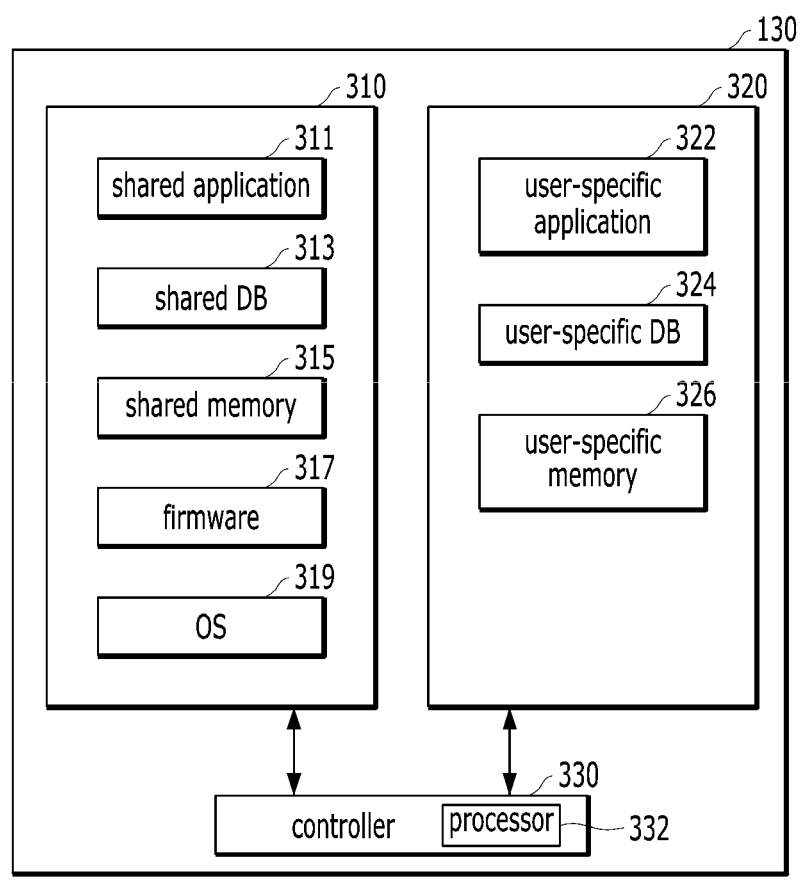
FIG. 4 is a block diagram of an exemplary embodiment of a cloud server shown in FIG. 1.

FIG. 4 is a block diagram of an exemplary embodiment of a cloud server shown in FIG. 1.

Referring to FIG. 4, a cloud server 130 according to an exemplary embodiment may include a read only file system 310 as a common service area, a read/write file system 310 as a user personal service area, and a controller 330 for controlling operations of the file systems 310 and 320.

The read only file system 310 may be a system in which data and devices stored in the file system cannot be changed by a user's operation and the read/write file system 320 is a file system that can ad, written, and stored by individual users.

The read only file system 310 may be a service area commonly applied to all the mobile terminals 110 connected to the cloud server 130. Accordingly, the read only file system 310 may include a shared application 311, a shared database 313, a shared memory 315, a firmware 317, and an operating system (OS) 319.

The shared application 311 may be an application that all the mobile terminals 110 basically use equally, such telephone, messaging, and/or camera functions and the like. In the same manner, the shared database 313 and the shared memory 315 may also store information that is equally applied to the mobile terminal 110. For example, the capacity of the shared memory 315 can be reduced by the number of mobile terminals because the mobile terminals 110 can use the shared memory 315 together.

The operating system 319 and the firmware 317 of the read only file system 310 may be equally utilized by all the mobile terminals 110 connected to the cloud server 130. Since the firmware 317 is included in the read only file system 310 which is a common service area, there is the same effect that all the mobile terminals 110 may have the same firmware upgrade through one firmware upgrade.

The read/write file system 320 is a service area that is individually applied to each of the mobile terminals 110_1, 110_2, . . . , and 110_n connected to the cloud server 130. Accordingly, the read/write file system 320 may include a user-specific application 322, a user-specific database (DB) 324, and a user-specific memory 326.

The user-specific application 322 is an application that is installed and executed independently by the corresponding mobile terminal user in each mobile terminal 110, such as applications that are individually downloaded by users from and application storefront program. Similarly, information corresponding to each mobile terminal can be independently stored/managed in the user-specific database (DB) 324 and the user-specific memory 326 in each mobile terminal.

Accordingly, the application and data installed and stored in the read/write file system 320 can be encrypted, backed up, and duplicated in the independent storage space (i.e., the user-specific memory 326) to which a security solution is applied.

The controller 330 may determine whether a request from the mobile terminal 110 is to be processed in the read only file system 310 or in the read/write file system 320, and connect to the corresponding file system.

The control unit 330 may include a processor 332 that can process signals of functional modules transmitted from the mobile terminal 110. The processor 332 may include high performance computing devices (e.g., CPU, GPU, RAM, etc.) and may be configured to process instructions of a computer program by performing basic arithmetic, logic, and I/O operations. Accordingly, the information generated using the functional modules 111, 113, 115, 117, and 119 included in the mobile terminal 110 is not processed in the terminal itself but is transmitted to the cloud server 130, and calculated in the cloud server 130.

This information may also be stored in the shared memory 315 of the read only file system 310 or in the user specific memory 326 of the read/write file system 320 according to the characteristics of the information.

The memory 315 and 326 may be computer-readable recording media and may include non-decaying mass storage devices such as RAM, ROM and disk drives. The memory 315 and 326 may also store an operating system and at least one program code. These software components may be loaded from a computer readable recording medium separate from the memories 315 and 326 using a drive mechanism. Such a computer-readable recording medium may include a recording medium such as a floppy drive, a disk, a tape, a DVD/CD-ROM drive, and a memory card. In addition, the software components may be loaded into the memory 315, 326 via a communication module (not shown).

That is, the cloud server 130 according to the exemplary embodiments may include the read only file system 310 for providing a common service applied to all the mobile terminals 110 in providing a cloud computing service, and the read/write file system 320 for providing an individual service to each of the mobile terminals are separated. Accordingly, the predetermined hardware of the cloud server can be used in common without depending on a specific user.

The mobile cloud system 100 according to the exemplary embodiments can provide the same usability, convenience and functionality as a high-end mobile terminal even though a low-end mobile terminal. That is, the mobile terminal 110 according to the exemplary embodiments may include various functional modules, and signals generated from the functional modules are transmitted to the cloud server 130. Also the signals can be calculated and stored by the read only file system 310 in the cloud server 130.

In addition, depending on the type of cloud computing service subscription, specifications of the mobile terminal can also be selected. For example, various billing models can be constructed by differentiating hardware characteristics (for example, the number of function modules and performance) according to the service subscription type.

Also, since the mobile cloud systems constructed according to exemplary embodiments store user-specific information (e.g., application for each user, data, etc.) in the read write file system 320 of the cloud server 130, data backup and recovery are facilitated and enhanced. For example, according to the mobile cloud system 100, since the core data is stored in the cloud server 130 even if the user loses the mobile terminal 110, data is not lost. In addition, when the mobile terminal is lost, the service can be easily stopped through the simple application.

In addition, since the shared application 311 is used by all the mobile terminals connected to the cloud server 130, an application having usage restriction per account can be shared by a plurality of users.

Figure 5:
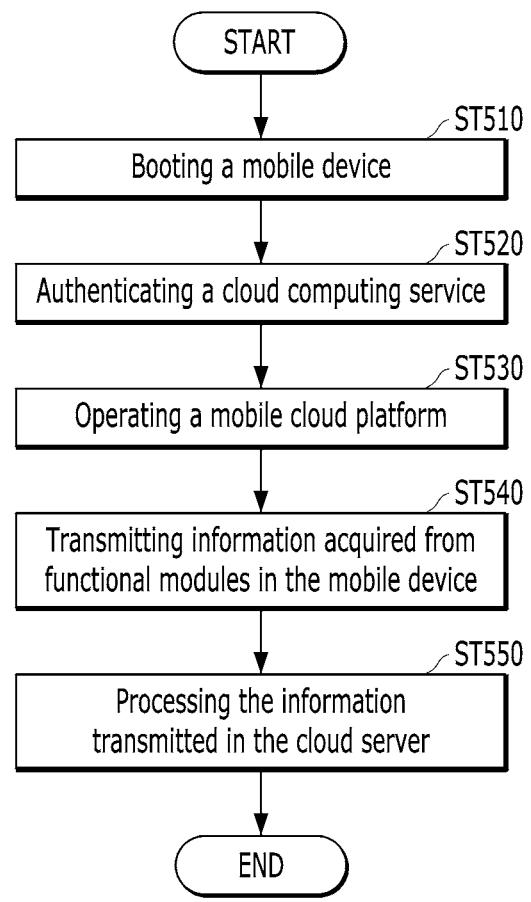
FIG. 5 is a flowchart illustrating an method of operating a mobile cloud system according to an exemplary embodiment of the invention.

FIG. 5 is a flowchart illustrating a method of operating a mobile cloud system according to an exemplary embodiment of the invention.

Referring to FIGS. 1 to 5, when the mobile terminal 110 is powered on, the mobile terminal starts booting (ST 510).

After that, service authentication is performed to determine whether the mobile terminal 110 can receive a cloud computing service before being connected to the cloud server 130 through the network connection unit 210 (ST 520). For example, the service authentication may utilize hardware information such as a MAC address, a CPU ID, and an IMEI allocated to each user using the mobile terminal through the booting step. That is, each time the cloud computing service is requested, it is possible to perform authentication through a method of allocating hardware using the hardware information.

After the authentication of the mobile terminal 110 is completed, the mobile cloud platform 200 installed in the mobile terminal 110 is operated to receive the cloud computing service (ST 530). That is, the cloud computing service is activated in the mobile terminal 110.

The cloud computing service may include an operation in which it transmits information generated using the functional modules of the mobile terminal to the cloud server 130, and the information is processed, calculated and/or stored in the cloud server.

That is, when the mobile cloud platform 200 is operated and the mobile terminal 110 receives the cloud computing service, the mobile terminal 110 may operate the function modules by using the operating system 319 in the read/write file system 310 of the cloud server 130 to execute each of the functions. The signals acquired by the function modules 111, 113, 115, 117, and 119, that is, signals generated by the user using the function modules, may be transmitted through the mobile cloud platform 200 to the cloud server 130 (ST 540).

The output signals from the functional modules may then be processed, i.e., computed and stored in the cloud server 130 (ST 550).

More specifically, the output signals of the function modules may be processed through a processor in the control unit 330 of the cloud server 130. The processor may include high performance computing devices (e.g., CPU, GPU, RAM, etc.).

If the output signals from the functional modules are information corresponding to the common service area, the information can be stored in the shared memory 315 of the read only file system 310. Also, if the output signals from the functional modules are information corresponding to the personalization service area, the information may be stored in the specific-user memory 326 of the read/write file system 320.

According to the exemplary embodiments, since operations such as calculation and storage are performed in the cloud server, even if the mobile terminal consists only of a minimum number of function modules, high performance/ high quality service can be provided through the cloud server and high security can be maintained.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A mobile cloud system, comprising:
   a plurality of mobile terminals, each of the plurality of mobile terminals having at least one functional module and a mobile cloud platform;
   a cloud server to receive and process information acquired from the at least one functional module, the cloud server including:
   a read-only file system to provide common services commonly applied to all the mobile terminals configured to be connected to the cloud server, the read-only file system including a shared database, a shared memory, firmware, an operating system, and first applications commonly used by the plurality of mobile terminals,
   a read/write file system to provide user-specific services individually applied to each of the mobile terminals configured to be connected to the cloud server, the read/write file system including a user-specific database, a user-specific memory, and applications containing information specific to individual ones of the plurality of mobile terminals, the applications being encrypted and backed up in the user-specific memory, and
   a controller configured to determine whether a request from the mobile terminal is to be processed in the read only file system or in the read/write file system, and to control operations of the read-only and read-write file systems by communicating the request to the corresponding file system; and
   a wireless communication network to provide one or more communication channels between the plurality of mobile terminals and the cloud server;
   wherein the mobile cloud platform is configured to manage authentication information of the mobile terminal.

2. The mobile cloud system of claim 1, wherein the at least one functional module comprises one or more of a display module, an audio module, an input module, a camera module, and a GPS module.

3. The mobile cloud system of claim 1, wherein the mobile cloud platform is further configured to: communicate with the wireless communication network and the cloud server, and maintain and manage a channel formed between the mobile terminal and the cloud server for providing a cloud service; and provide the cloud service to the mobile terminal.

4. The mobile cloud system of claim 3, wherein the authentication information includes at least one of hardware information such as a MAC address, a CPU ID, and an IMEI allocated to each mobile terminal.

5. The mobile cloud system of claim 3, wherein the cloud service comprises a cloud computing service.

6. The mobile cloud system of claim 1, wherein the read-only file system comprises a shared database, a shared memory, firmware, an operating system, and applications commonly used by the plurality of mobile terminals.

7. The mobile cloud system of claim 1, wherein the controller comprises a processor capable of processing signals of the at least one functional module transmitted from the plurality of mobile terminals.

8. A method of operating a mobile cloud system, the method comprising the steps of:
   booting a mobile terminal having at least one functional module and a mobile cloud platform;
   authenticating whether the mobile terminal can receive a cloud service;
   operating the mobile cloud platform installed in the mobile terminal and activating the cloud service;
   transmitting signals acquired from the at least one function module in the mobile terminal to a cloud server through the mobile cloud platform;
   processing the signals from the at least one function module in the cloud server, and managing authentication information of the mobile terminal in the mobile cloud platform, wherein the step of processing the signals further comprises the steps of:
   determining whether the signals from the at least one functional module are to be processed in a read only file system including a shared database, a shared memory, firmware, an operating system, and first applications commonly used by the plurality of mobile terminals, or in a read/write file system including a user-specific database, a user-specific memory, and second applications containing information specific to individual ones of the plurality of mobile terminals, the second applications being encrypted and backed up in the user-specific memory, in the cloud server;

storing information in the shared memory of the read only file system in the cloud server if the signals from the at least one functional module comprising information corresponding to a common service area, and providing services commonly applied to all the mobile terminals connected to the cloud server; and storing information in the specific-user memory of the read/write file system in the cloud server if the signals from the at least one functional module comprising information corresponding to a user-specific service area, and providing user-specific services individually applied to each of the mobile terminals connected to the cloud server.

9. The operating method of claim 8, wherein the step of authentication comprises allocating hardware by using information from at least one of a MAC address, a CPU ID, and an IMEI allocated to each user who uses the mobile terminal whenever the cloud service is requested.

10. The operating method of claim 8, wherein the step of operating the mobile cloud platform installed in the mobile terminal and activating the cloud service comprises activating a cloud computing service.

11. The operating method of claim 8, further comprising the step of: communicating with a wireless communication network and the cloud server, and maintaining and managing a channel formed between the mobile terminal and the cloud server for providing a cloud service; and providing the cloud service to the mobile terminal.

* * * * *